Figure 1:
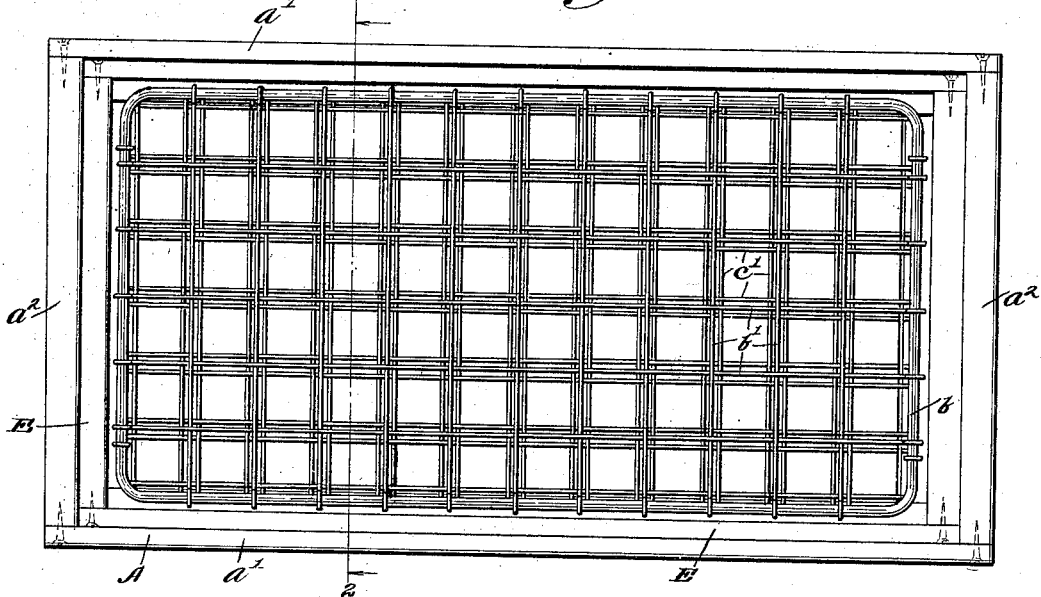

No. 726,478. PATENTED APR. 28, 1903.
H. C. SUMPTER.
EGG OR FRUIT BOX.
APPLICATION FILED JAN. 20, 1902.
NO MODEL. 2 SHEETS—SHEET 1.

Witnesses:
Ira D. Perry
J. B. Weir

Inventor:
Henry C. Sumpter,
By Chas. C. Buckley,
Atty.

THE NORRIS PETERS CO., PHOTO-LITHO., WASHINGTON, D. C.

No. 726,478. PATENTED APR. 28, 1903.
H. C. SUMPTER.
EGG OR FRUIT BOX.
APPLICATION FILED JAN. 20, 1902.
NO MODEL. 2 SHEETS—SHEET 2.

Witnesses:
Ira D. Perry
J. B. Weir

Inventor:
Henry C. Sumpter,
By Chas. E. Buckley, Atty.

UNITED STATES PATENT OFFICE.

HENRY C. SUMPTER, OF CHICAGO, ILLINOIS.

EGG OR FRUIT BOX.

SPECIFICATION forming part of Letters Patent No. 726,478, dated April 28, 1903.

Application filed January 20, 1902. Serial No. 90,392. (No model.)

*To all whom it may concern:*

Be it known that I, HENRY C. SUMPTER, a citizen of the United States, residing at Chicago, county of Cook, and State of Illinois, have invented certain new and useful Improvements in Egg or Fruit Boxes, of which the following is a specification.

My invention relates to boxes or crates for carrying or shipping eggs, fruit, or similar products, and more particularly to boxes or crates of this character involving a plurality of superimposed fillers, the latter being constructed and arranged to properly hold and separate the eggs or fruit. In devices of this character it has usually been the practice to provide each box or crate with a plurality of superimposed fillers, which have usually been composed of pasteboard or like material and which are each constructed so as to provide a plurality of cells or pockets. In use the eggs or fruit are deposited in these cells or pockets, the partitions separating the same from each other, and a number of these fillers thus loaded are then arranged one on top of the other in a suitable crate or box. In this way eggs, fruit, or other products are carried in a safe and convenient manner. In carrying and shipping eggs in this manner it often happens, however, that the pasteboard fillers have become objectionably saturated with some substance or liquid which renders the eggs unfit for use. Owing to their character, eggs tend to readily absorb liquids or substances and to often become saturated or tainted with objectionable odors. Thus it will be seen that with fillers composed of paper, pasteboard, or of like materials there is more or less danger of spoiling the eggs. This is also apt to be the case with fruit.

Generally stated, it is therefore the object of my invention to provide a filler adapted to afford a convenient method of shipping eggs or fruit and, further, adapted to insure against breakage or spoiling of these products.

A special object of my invention is to provide a simple and inexpensive form of metallic filler for use in egg or fruit crates.

Another object of my invention is to provide a form of filler which will facilitate the testing of eggs.

It is also an object of my invention to provide a filler so constructed that both the loading and unloading of the fillers will be greatly facilitated.

A further object of my invention is to provide a construction tending to render a device of this character less expensive to manufacture.

As a further object and advantage my invention contemplates a filler which is practically indestructible.

In addition to these it is also an object of my invention to provide certain details and features of improvement tending to increase the general efficiency and to render a crate or box for this purpose more serviceable and satisfactory in use.

To the foregoing and other useful ends my invention consists in matters hereinafter set forth.

Figure 2:
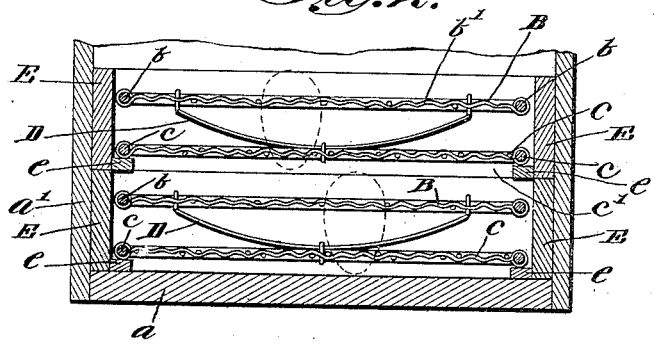
Figure 3:
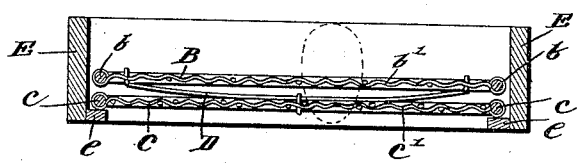
Figure 4:
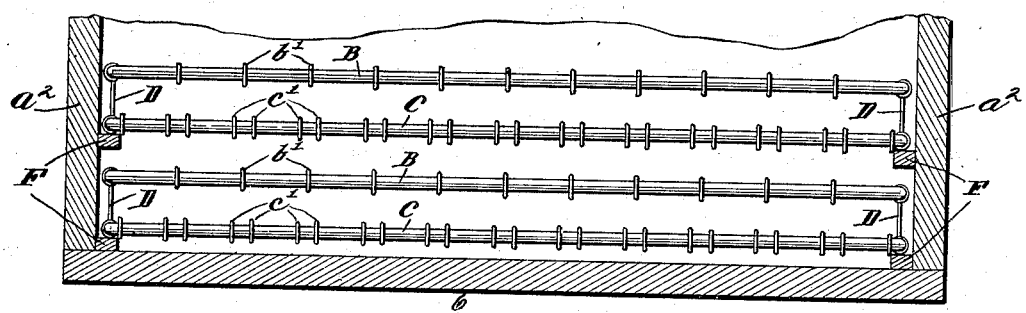
Figure 5:
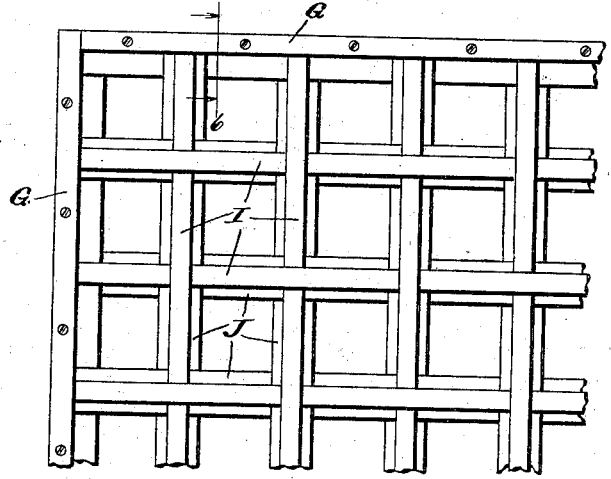
Figure 6:
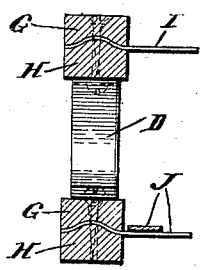
Figure 7:
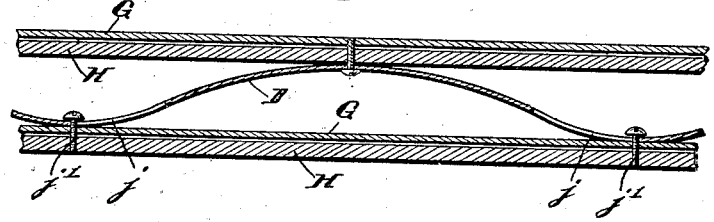

In the accompanying drawings, Figure 1 is a plan of an egg or fruit box, showing a filler constructed in accordance with my invention. Fig. 2 is a section on line 2 2 in Fig. 1. Fig. 3 is a cross-section through the filler shown in Fig. 2, showing the upper and lower sections of the filler compressed or moved together for the purpose of facilitating the unloading of the eggs or fruit. Fig. 4 shows another arrangement for mounting the fillers in a box or crate. Fig. 5 shows a portion of a filler constructed of bamboo or ratan instead of wire. Fig. 6 is a section on line 6 6 in Fig. 5. Fig. 7 is a detail showing the spring for connecting the upper and lower sections of the filler shown in Fig. 5.

As illustrated, the box or crate can be made of any suitable form of construction and, as shown in Figs. 1, 2, and 3, may consist of a plain box or crate, having a bottom $a$ and also side and end walls $a'$ and $a^2$. It will be understood that the top of the box can be provided with a removable cover. With this arrangement the fillers can be placed in the box one at a time and arranged in a superimposed or one-on-top-of-the-other condition. As shown in Figs. 1, 2, and 3, each filler is constructed of metal, preferably wire, and is mounted in a frame, which may be of wood or other suitable material. The metallic filler thus provided is preferably composed of upper and lower sections B and C, the upper section consisting of a rectangular metal frame b, across which are stretched wires b', and the lower section consisting of a like metallic frame c, across which are stretched the wires c'. It will be observed that the lower section is provided with two wires, where the upper is provided with but one, thereby providing the lower section with squares or openings which are relatively smaller than the like openings in the upper section. The two metallic filler-sections thus arranged one above the other are preferably connected by springs D, which can be arranged at the ends of the filler. These springs are adapted to hold the two sections of the filler normally apart, and the distance between the two sections is preferably such that the eggs rest in place in the openings in the lower section and are held apart by the wires of the upper section, substantially as shown in Fig. 2. In this figure it will be seen that each filler is mounted in a rectangular frame E, provided, preferably, with cleats or ledges e, which latter support the said filler. A number of these metallic wire fillers and their associate filler-frames can be arranged one upon the other in the said box or crate, and the eggs are in this way held in superimposed tiers or layers. It will be observed that each filler-frame E is preferably of such depth as to properly separate one tier or layer of eggs from the other. With this construction it will be seen that the cells for the eggs are open at the top and bottom and that consequently the eggs can be easily tested. For example, a filler when loaded with eggs can be tilted and held up to the light in such manner as to permit the making of the usual test. It will be seen that the eggs can be deposited upon the top of the upper section and that a slight agitation or shaking of the filler will cause the eggs to readily adjust themselves within the cells. In unloading a filler the upper section B is pressed down to the position shown in Fig. 3, so as to allow the eggs to project above the upper surface of the filler in a manner to permit them to be readily grasped and removed from the cells. When moved together, as shown in Fig. 3, the two sections of the filler compress the springs, and when the eggs have been removed these springs automatically restore the filler to its normal or distended condition.

In Fig. 4 the filler-frames are dispensed with and the cleats for supporting the fillers are mounted directly upon the walls of the box or crate. Thus with this arrangement the side of the box or crate may be left open and each filler when properly loaded can be inserted through the open side of the box or crate and adjusted in place upon the cleats or ledges F. In this way the metallic fillers, composed, as stated, preferably of metal, can be employed in a variety of ways either in connection with wooden filler-frames or independent thereof, as shown in Fig. 4.

In Fig. 5 the filler is shown constructed of bamboo or ratan instead of metal. The bamboo or ratan is hard and of a non-absorbent character and may, if desired, be employed in the place of metal. With a filler constructed of bamboo or ratan or of like material the rectangular frames of the upper and lower sections can be constructed as shown in Fig. 6. In this figure it will be seen that each frame is composed of two parts G and H, between which are clamped the ends of the bamboo or ratan strips I. When thus made of bamboo or ratan or other equivalent material, it will be seen that the cross-strips in the lower section of the filler can be made wide, as shown in Fig. 5, thereby obviating the necessity of reducing the area of the lower openings by providing two parallel strips, as shown in Fig. 1. In either case, however, it will be seen that the cells for eggs or fruit are open at both ends and are contracted at their lower ends, so as to keep the fruit or eggs from falling through.

In Fig. 7 the flat springs J are employed for maintaining the normal separation of the upper and lower sections of the filler. (Shown in Figs. 5 and 6.) These flat springs, it will be seen, are provided with slots j, through which extend the screws j'. These slots permit the desired relative movement between the two sections of the filler.

Thus it will be seen that with a filler constructed in accordance with my invention there is a free circulation of air throughout the crate or box. Furthermore, the character of the fillers employed makes it possible to reduce the size and weight of the box or crate. As a further advantage the fillers are composed of only a small amount of material, which is preferably metal or some hard substance, and in this way the eggs or fruit are not liable to become tainted or spoiled by reason of the fillers having become saturated with some objectionable substance or liquid. Again, the fillers are easily and readily loaded and unloaded, and, as stated, each filler when loaded can be tilted up to the light in order to permit the eggs to be tested. The construction is so simple that the cost of manufacture is relatively small. Again, the character of the filler renders it more serviceable and permits it to be used many times. In fact, with a filler constructed as shown and described it is practically indestructible. In addition a filler of this character insures against breakage of the eggs during shipment. This is for the reason that the springy or yielding character of the fillers tends to absorb or counteract the jolting or jarring usually incident to shipment and handling.

The wires with which the upper and lower frames of each filler are strung insure the requisite degree of resiliency, regardless of the stiffness of the springs interposed between the two frames. In other words, the upper and lower sections of each filler are connected only at their marginal portions, thereby leaving their springy center portions free to more perfectly absorb vibration and prevent injury to the eggs or fruit. Thus each filler has a certain degree of resiliency or springiness which is in no way dependent upon the springs which are interposed between the upper and lower sections. Furthermore, it will be seen that my invention contemplates a wholly metallic wire filler removably mounted in a removable wooden filler-frame. Thus the fillers can, if desired, be employed in conjunction with ordinary wooden filler-frames; but at the same time each filler can be of a character to prevent the absorption of any objectionable odors or liquids or substances which might taint the eggs or fruit. Furthermore, with this construction each filler can be removed from its allotted frame and washed or cleaned and then used again.

As explained, each filler is made in sections, and these sections are preferably connected only at their edges or marginal portions. In other words, the supporting structure of each filler is composed of different sections or divisions, the different sections combining to provide the supporting pockets or cells.

What I claim as my invention is—

1. A filler for use in egg and fruit crates, consisting of upper and lower reticulated flat sections, and a pair of bow-shaped springs interposed between said sections, whereby the two sections may be compressed or brought together.

2. In an egg and fruit crate, the combination of a suitable receptacle, a plurality of fillers arranged one above the other, each filler being composed of upper and lower sections having registering openings, and springs for yieldingly connecting the upper and lower sections of each filler.

3. In an egg or fruit crate, the combination of a suitable receptacle, a plurality of fillers arranged one above the other, each filler being composed of upper and lower sections having registering openings, the openings in each lower section being smaller than the openings in each upper section, and springs interposed between the upper and lower sections of each filler, said springs being adapted to yieldingly maintain the two sections of each filler the proper distance apart.

4. In an egg or fruit crate, the combination of a suitable receptacle, and a plurality of fillers arranged one above the other in said receptacle, each filler being composed of yieldingly-connected sections.

5. A filler for use in fruit or egg crates, consisting of upper and lower sections yieldingly connected by springs, the upper section being provided with relatively large openings, and the lower section being provided with relatively small openings, the openings of the upper and lower sections being arranged opposite, so as to provide the filler with cells or carrying-pockets which are open at top and bottom and contracted at their lower ends.

6. The combination of a suitable box or crate, a plurality of wooden filler-frames arranged one on top the other in said box or crate, each frame being open at both top and bottom and a wholly metallic wire filler removably mounted in each filler-frame, each metallic filler having cells or pockets which are also open at top and bottom.

7. The combination of a suitable box or crate, a plurality of wooden filler-frames arranged one on top the other in said box or crate, and a wholly metallic filler removably mounted in each of said frames, each filler consisting of yieldingly-connected upper and lower reticulated flat sections.

8. The combination of a suitable box or crate, and a plurality of fillers arranged one above the other in said box or crate, each filler consisting of upper and lower yieldingly-connected frames, each frame being strung with wires crossing each other at right angles to provide openings or pockets.

9. The combination of a suitable box or crate, a plurality of filler-frames arranged one on top the other in said box or crate, and a springy or resilient filler removably mounted in each of said frames.

10. A filler for use in fruit or egg crates, consisting of two rectangular frames arranged one above the other with intervening space, means for connecting the frames at their sides, wires stretched across each frame and crossing each other at right angles, the filler thus constructed comprising upper and lower flat reticulated sections connected at their sides but free and springy or yielding at their center portions.

11. A filler for use in fruit or egg crates, consisting of upper and lower flat reticulated springy sections connected at their marginal portions only, the lower section having relatively small openings which register with relatively large openings in the upper section, whereby the eggs or fruit rest in the said relatively small openings in the lower section and are held in a separated condition by the upper section.

12. A filler for use in fruit or egg crates, consisting of upper and lower flat reticulated springy sections connected only at their marginal portions, each section consisting of a frame strung with strips of suitable material crossing each other at right angles, the relatively small openings of the lower section registering with the relatively large openings of the upper section, whereby the fruit or eggs rest in the said relatively small openings in the lower section and are held in a separated condition by the strips of the said upper section.

13. The combination of a suitable receptacle, cleats arranged within the said receptacle and one above the other, and a plurality of fillers arranged one above the other and removably resting on said cleats, each filler consisting of upper and lower flat reticulated springy sections connected only at their marginal portions, the relatively small openings of the lower section registering with the relatively large openings of the upper section, whereby the fruit or eggs rest in the said relatively small openings and are held in a separated condition by the said upper section.

Signed by me at Chicago, Cook county, Illinois, this 17th day of January, 1902.

HENRY C. SUMPTER.

Witnesses:
ARTHUR F. DURAND,
HARRY P. BAUMGARTNER.